United States Patent
Bass et al.

(10) Patent No.: US 6,584,518 B1
(45) Date of Patent: Jun. 24, 2003

(54) CYCLE SAVING TECHNIQUE FOR MANAGING LINKED LISTS

(75) Inventors: Brian Mitchell Bass, Apex, NC (US); Jean Louis Calvignac, Cary, NC (US); Marco C. Heddes, Raleigh, NC (US); Michael Steven Siegel, Raleigh, NC (US); Michael Raymond Trombley, Cary, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/479,751

(22) Filed: Jan. 7, 2000

(51) Int. Cl.[7] .............................................. G06F 13/14
(52) U.S. Cl. ..................... 710/52; 370/230; 370/236; 370/390
(58) Field of Search ........................... 710/52; 370/236, 370/390, 230

(56) References Cited

U.S. PATENT DOCUMENTS

| 5,530,897 A | 6/1996 | Meritt |
| 5,634,015 A | 5/1997 | Chang et al. |
| 5,781,549 A | 7/1998 | Dai |
| 5,872,769 A * | 2/1999 | Caldara et al. ............. 370/230 |
| 6,349,097 B1 * | 2/2002 | Smith ......................... 370/390 |
| 6,445,680 B1 * | 9/2002 | Moyal ........................ 370/236 |

* cited by examiner

Primary Examiner—Jeffrey Gaffin
Assistant Examiner—Abdelmoniem Elamin
(74) Attorney, Agent, or Firm—Bracewell & Patterson LLP

(57) ABSTRACT

A method and system for queueing data within a data storage device including a set of storage blocks each having an address, a pointer field, and a data field. This set of storage blocks comprises a linked list of associated storage blocks and also a free pool of available storage blocks. The storage device further includes a tail register for tracking an empty tail block from which a data object is enqueued into the linked list. A request to enqueue a data object into the linked list is received within the data storage system. In response to the data enqueue request, an available storage block from the free pool is selected and associated with the tail register. A single write operation is then required to write the data object into the data field of a current tail block and to write the address of the selected storage block into the pointer field of the current tail block, such that the selected storage block becomes a new tail block to which the tail register points.

23 Claims, 7 Drawing Sheets

CYCLE SAVING TECHNIQUE FOR MANAGING LINKED LISTS

BACKGROUND OF THE INVENTION

1. Technical Field

The present invention relates in general to a method and system for managing memory devices and in particular to a method and system for providing enhanced queueing efficiency within a data storage device. More particularly, the present invention relates to an improved memory linking method and system whereby storage block addresses and data objects are strategically associated, such that the number of system cycles required to enqueue or dequeue to or from a data storage system is reduced.

2. Description of the Related Art

A "linked list" is known in both the hardware memory and software arts as a chain of items which each point to the next item in the linked list in a sequential manner. Such a list of elements or nodes comprise an ordered data structure which is held together by the use of pointers. Within this context, a "pointer" is a variable that comprises the memory location (memory address) of the data block to which it points in sequence. A singly linked list is comprised of data blocks which include a single pointer to the next sequential block. Each of the data blocks in a double linked list includes two pointers—one pointing to the following block and the other pointing to the preceding block. In a circular-linked list, the last data block points to the first data block.

Referring to FIG. 1, there is depicted a conventional memory management system 100. As seen in FIG. 1, memory management system 100 includes a linked list 105 having serially linked storage blocks 108, 110, and 112. In this three-block linked list, storage block 108 is the first storage block (hereinafter referred to as the "head") within the series, and storage block 112 is the last storage block (hereinafter referred to as the "tail").

Memory management system 100 further includes a head register 102, a tail register 104, and a count register 106 which function as boundary and parametric guides for linked list 105. Head register 102 tracks head block 108 from which data objects within linked list 105 are dequeued. Count register 106 maintains a count of the number of storage blocks within linked list 105. This count is updated for each enqueueing or dequeueing operation performed by memory management system 100. Tail register 104 tracks tail block 112 prior to a conventional data enqueue operation such as that described as follows.

A typical enqueueing process is initiated by a request to memory management system 100 to add a data object 126 to linked list 105. In response to the data enqueue request, the address of tail block 112 is read from tail register 104. An address register (not depicted) for free pool 130 is then accessed to obtain the address of an available storage block 114 within free pool 130. The address of storage block 114 will become a new tail pointer 121 which is written into pointer field 120 of old tail block 112. A second write operation is then required to write data object 126 into the data field of new tail block 114. A data enqueueing operation within memory management system 100 thus requires accessing and writing to two physically separate memory locations which is costly in terms of processing overhead.

It would therefore be desirable to provide a method and system for reducing the number of processing cycles required to queue data to or from a linked list data storage device.

SUMMARY OF THE INVENTION

A method and system are disclosed for queueing data within a data storage device including a set of storage blocks each having an address, a pointer field, and a data field. This set of storage blocks comprises a linked list of associated storage blocks and also a free pool of available storage blocks. The storage device further includes a tail register for tracking an empty tail block from which a data object is enqueued into the linked list. A request to enqueue a data object into the linked list is received within the data storage system. In response to the data enqueue request, an available storage block from the free pool is selected and associated with the tail register. A single write operation is then required to write the data object into the data field of a current tail block and to write the address of the selected storage block into the pointer field of the current tail block, such that the selected storage block becomes a new tail block to which the tail register points.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF A PREFERRED EMBODIMENT

The present invention provides a method and system for improving the speed and efficiency of memory access operations by reducing the processing overhead required for such operations. Linked lists are well known in the art as a means for organizing groups of related information within a computer storage device such as a random access memory (RAM), data input/output buffers, and the like. The utility of linked lists is particularly pronounced within data storage systems having high input/output (I/O) throughput. An example of such a data storage system are the memory I/O buffers utilized within telecommunications network processors. Within such network processors, data objects such as data frames or cells from many different telecommunications sessions must be temporarily stored. As data frames from different sessions are stored and released from a buffer within the network processor, the association of related frames, in terms of physical proximity, becomes fragmented. Linked lists provide the necessary associativity among related frames within this physically fragmented environment.

Fundamental to linking systems is the concept of "pointing" by which such lists of related information are maintained and organized. A linked list management method and system, described in further detail hereinbelow, provides an improved pointing scheme by which fewer processor cycles are required for queuing data to or from a linked list.

Figure 1:
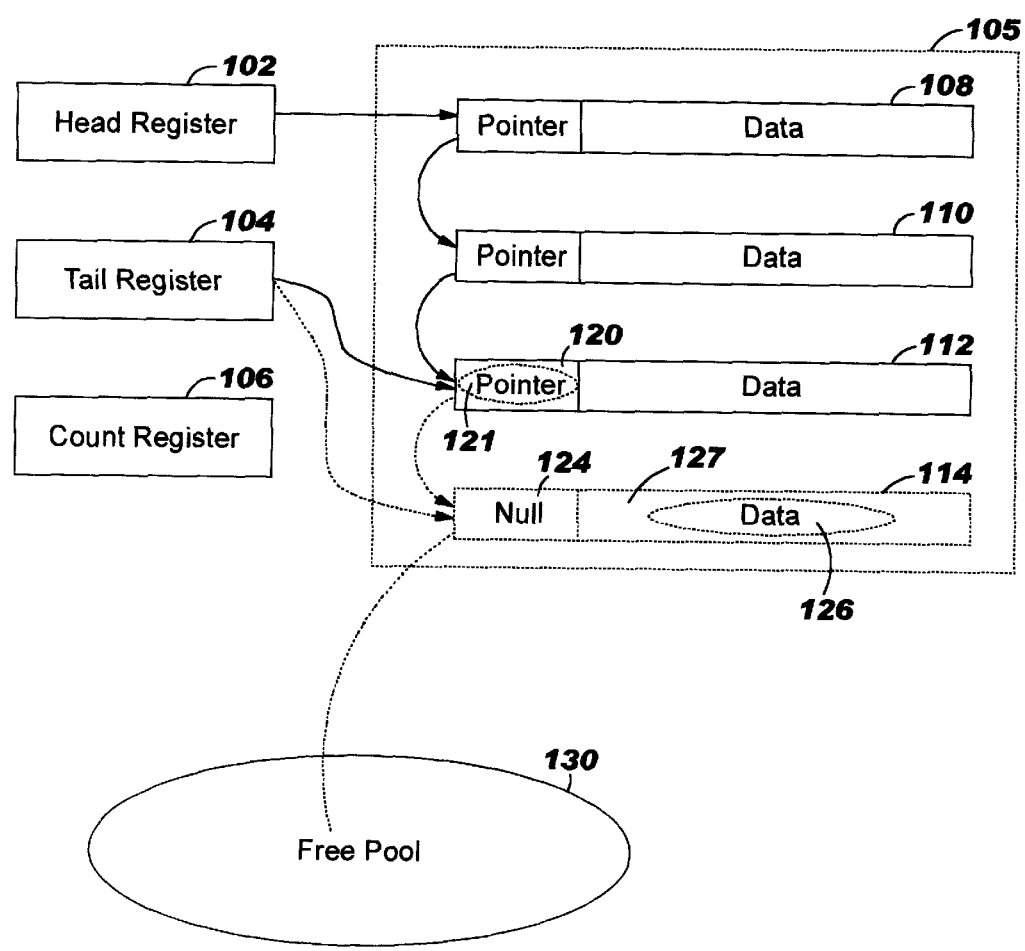
FIG. 1 depicts a conventional linked list data management system.
Figure 2:
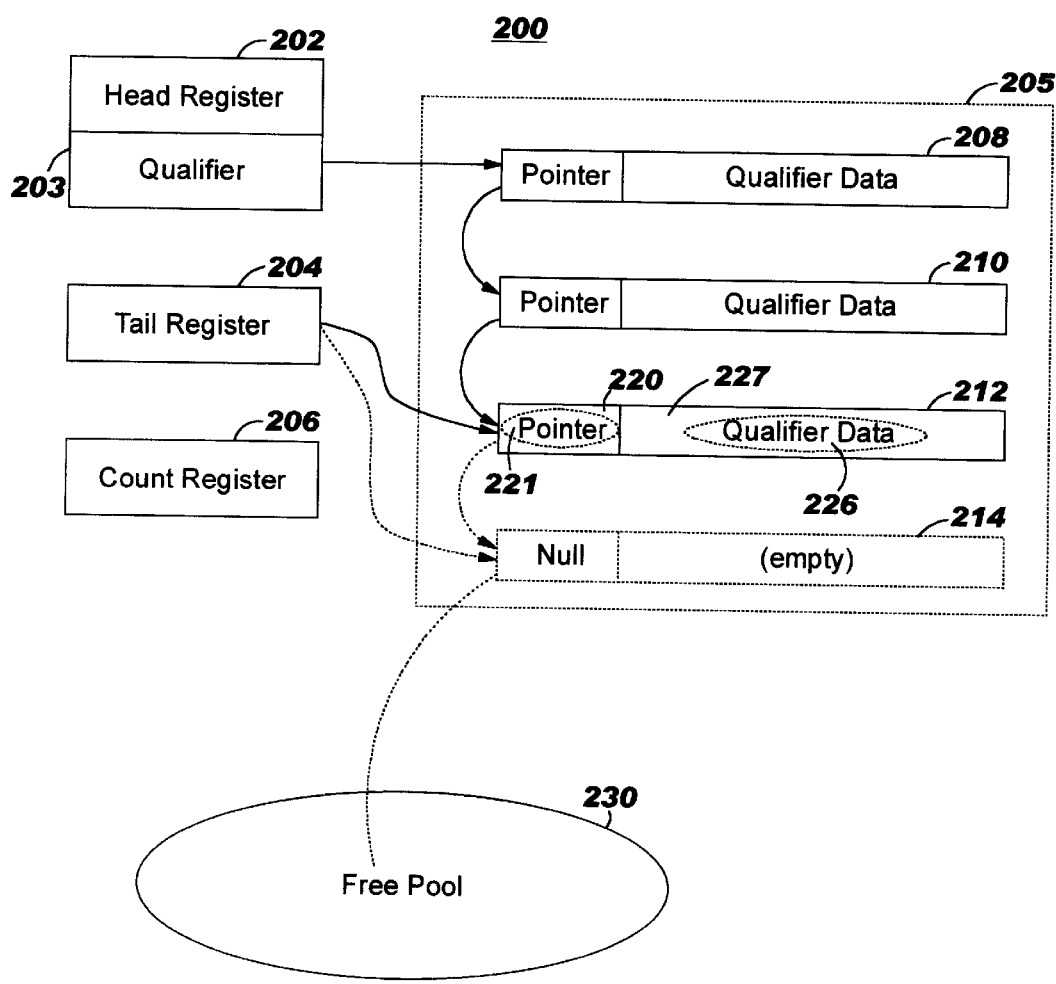
FIG. 2 depicts a memory management system in accordance with a preferred embodiment of the present invention.

FIG. 2 depicts a memory management system 200 in accordance with a preferred embodiment of the present invention. As seen in FIG. 2, memory management system 200 includes a linked list 205 comprising serially linked storage blocks 208, 210, and 212. Each storage block within linked list 205 includes a data field, a pointer field, and its own memory address. Storage block 208 is the current "head" storage block from which data is dequeued from linked list 205. Storage block 212 is the current "tail" storage block to which data is enqueued into linked list 205. As described in further detail hereinbelow, a data enqueueing operation will result in tail block 212 being replaced by a new tail block 214.

Memory management system 200 further includes a head register 202, a tail register 204, and a count register 206 which function as boundary and parametric guides for linked list 205. Head register 202 tracks head block 208 and is thus read when one or more storage blocks are dequeued from linked list 205. A count register 206 maintains a count of the number of storage blocks within linked list 205. This count is updated following each enqueue or dequeue operation performed by memory management system 200. Tail register 204 functions to identify whichever storage block is currently the tail block (storage block 212 is the current tail in linked list 205) and is thus read prior to enqueueing data into linked list 205.

It should be noted that within the data fields of all but the tail, the data field contains "qualifier" data. As utilized within memory management system 200, a "qualifier" is data that is material with respect to the next sequential storage block in the list (the storage block that the pointer points to). Qualifier data provides an additional data organization facility within I/O data queues. Qualifiers may be utilized to obtain information regarding the next sequential block within a list without having to directly access that block. Qualifiers may also be useful for facilitating the movement of data objects between separate lists. With respect to data queueing, and as depicted in FIG. 2, head register 202 includes qualifier data register 203 containing qualifier data for head storage block 208. The inclusion of qualifier data within head register 202 is the result of the method utilized to reduce the number of write operations required to enqueue an additional storage block into linked list 205.

A data enqueueing operation within memory management system 200 is initiated by a request to add a data object 226 to linked list 205. In response the data enqueue request, the address of current tail block 212 is read from tail register 204. An address register (not depicted) for free pool 230 is then accessed to obtain the address of an available storage block 214. The address of storage block 214 serves as a new pointer 221 which links storage block 214 to linked list 205. A single write operation may be utilized to write new pointer 221 to a pointer field 220 of the original tail block 212 and also to write data object 226 to a data field 227 of original tail block 212. By combining tail pointer 221 and the latest-enqueued data object 226 in the same storage block, the method and system of the present invention eliminates the processing overhead required for a second write operation during a data enqueue operation to linked list 205.

Figure 3:
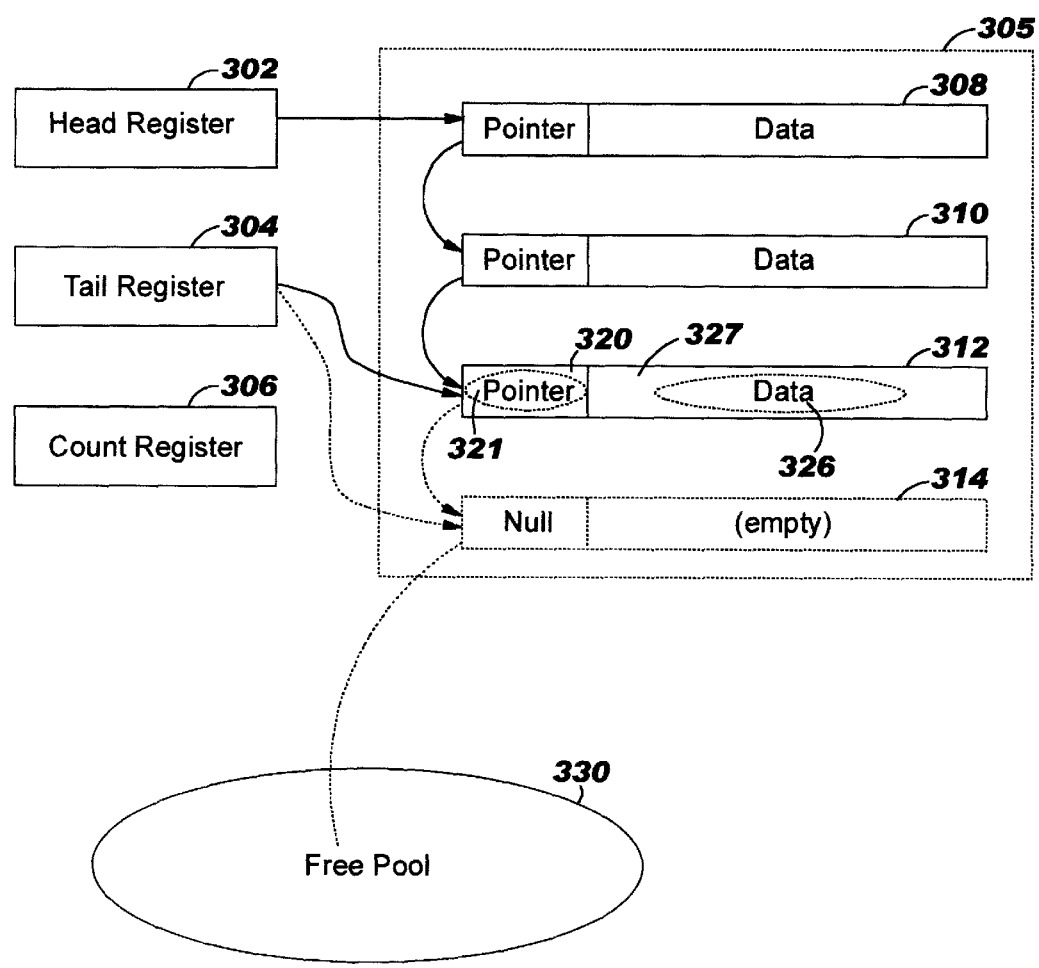
FIG. 3 illustrates a memory management system in accordance with an alternate embodiment of the present invention.

With reference now to FIG. 3, there is illustrated a memory management system 300 in accordance with an alternate embodiment of the method and system of the present invention. As seen in FIG. 3, memory management system 300 includes a linked list 305 comprising serially linked storage blocks 308, 310, and 312. Similar to head block 208, storage block 308 is the head block from which data is dequeued from linked list 305. Storage block 312 is the tail block to which data is enqueued into linked list 305. As described in further detail hereinbelow, a data enqueueing operation will result in tail block 312 being replaced by a new tail block 314.

Memory management system 300 further includes a head register 302, a tail register 304, and a count register 306 which function as boundary and parametric guides for linked list 305. Head register 302 tracks head block 308 and is thus read when one or more storage blocks are dequeued from linked list 305. A count register 306 maintains a count of the number of storage blocks within linked list 305. This count is updated following each enqueue or dequeue operation performed by memory management system 300. Tail register 304 functions to identify the current tail block (storage block 312 is the current tail in linked list 305) and is thus read prior to enqueueing data into linked list 305.

A data enqueueing operation within memory management system 300 is initiated by a request to add a data object 326 to linked list 305. In response the data enqueue request, the address of current tail block 312 is read from tail register 304. An address register (not depicted) for free pool 330 is then accessed to obtain the address of an available storage block 314 within free pool 330. The address of storage block 314 becomes a new pointer 321 which links storage block 314 to linked list 305. A single write operation may be utilized to write new pointer 321 to a pointer field 320 of the original tail block 312 and also to write data object 326 to a data field 327 of original tail block 312. By combining tail pointer 321 and the latest-enqueued data object 326 in the same storage block, the method and system of the present invention eliminates the processing overhead required for a second write operation during a data enqueue operation to linked list 305.

Figure 4:
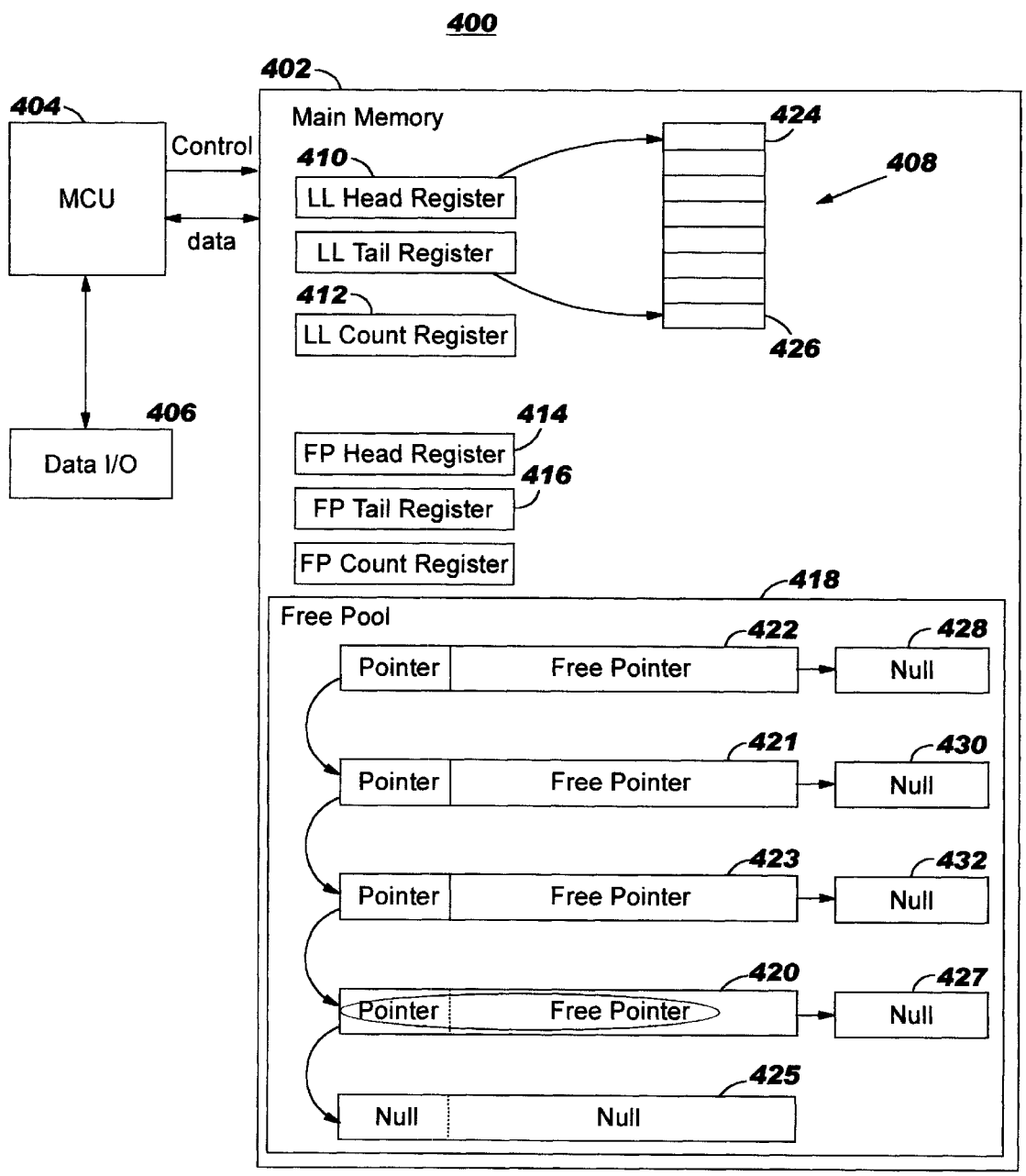
FIG. 4 is a high-level block diagram depicting a data storage device in accordance with a preferred embodiment of the present invention.

Turning now to FIG. 4, there is illustrated a high-level block diagram depicting a data storage device 400 in accordance with a preferred embodiment of the present invention. Data storage system 400 includes a memory control unit (MCU) 404, and a main memory 402. Both MCU 404 and main memory 402 may be located within a single data processing system such as a personal computer, a workstation, a telecommunications network processor, etc. As illustrated in FIG. 4, MCU 404 passes control commands in the form of read and write requests to main memory 402, such that data may be transferred to and from data input/output (I/O) interface 406.

Main memory 402 is constructed in accordance with the teachings of the present invention, and may therefore include several of the features of memory management systems 200 and 300. Included among such features are a head register 410 and a tail register 412 for tracking a head storage block 424 and a tail storage block 426 within a linked list 408. In accordance with the method and system of the present invention, tail block 426 includes both an empty pointer field and an empty (or overwriteable) data field.

It should be noted that linked list 408 may be regarded as a "data queue". Furthermore, in a context in which data storage device 400 is utilized within a telecommunications network system, such as a network processor, main memory 402 will comprise many such queues (referred to hereinafter as "flow queues"). While main memory 402 may include tens or hundreds of thousands of such flow queues, only a small subset of these will be active at any given time. Reserving an empty storage block for each inactive or "empty" flow queue would result in substantial depletion of the real-time storage capacity of data storage system 400. This empty queue reservation problem is addressed within data storage system 400 by utilizing a linked free pool 418.

Linked free pool 418 includes multiple storage blocks that are currently available to be enqueued within linked list 408. The available storage blocks within linked free pool 418 comprise a specialized linked list in which approximately half of the storage blocks are designated "pointer blocks" (blocks 422, 421, 423, and 420) and the remaining half consisting of blocks 428, 430, 432, and 427 are "non-pointer blocks". It should be noted that each of pointer blocks 422, 421, 423, and 420 include two pointers—free pointer and a linked list pointer. As seen in FIG. 4, the linked list pointers are written within the pointer fields of pointer blocks 422, 421, 423, and 420. These pointers are utilized to maintain a singly pointed list in which block 425 serves as the tail to which an additional pair of storage blocks may be enqueued into linked free pool 418. Pointer block 422 serves as the current head block from which a pair of blocks may be dequeued from linked free pool 418. In addition to having linked list pointers, pointer blocks 422, 421, 423, and 420 also include free pointers within their respective data fields which point to non-pointer blocks 428, 430, 432, and 427. Similar to the head and tail tracking scheme of linked list 408, linked free pool 418 includes a free pool head register 414 for tracking the address of the current head block 422. A free pool tail register 416 tracks the address of the current tail block 425.

Turning back to FIG. 3 it will be recalled that a data enqueue operation illustrated and described therein requires writing to only one storage block, the "old tail". It should be noted that a consequence of this queueing management technique is an "empty tail" condition which may substantially deplete the number of available storage blocks if inactive flow queues are not eliminated. To avoid such memory depletion, the last two remaining storage blocks within linked list 408, comprising the last valid entry block and the empty tail block, are returned to linked free pool 418 when linked list 408 goes from a non-empty to an empty state. As depicted and explained in greater detail with reference to FIG. 6, the dual linking structure of linked free pool 418, permits the enqueueing of two storage blocks with a single write operation to the free pool tail block when a flow queue within main memory 402 is deactivated (empty) from an active (non-empty) state.

Figure 6:
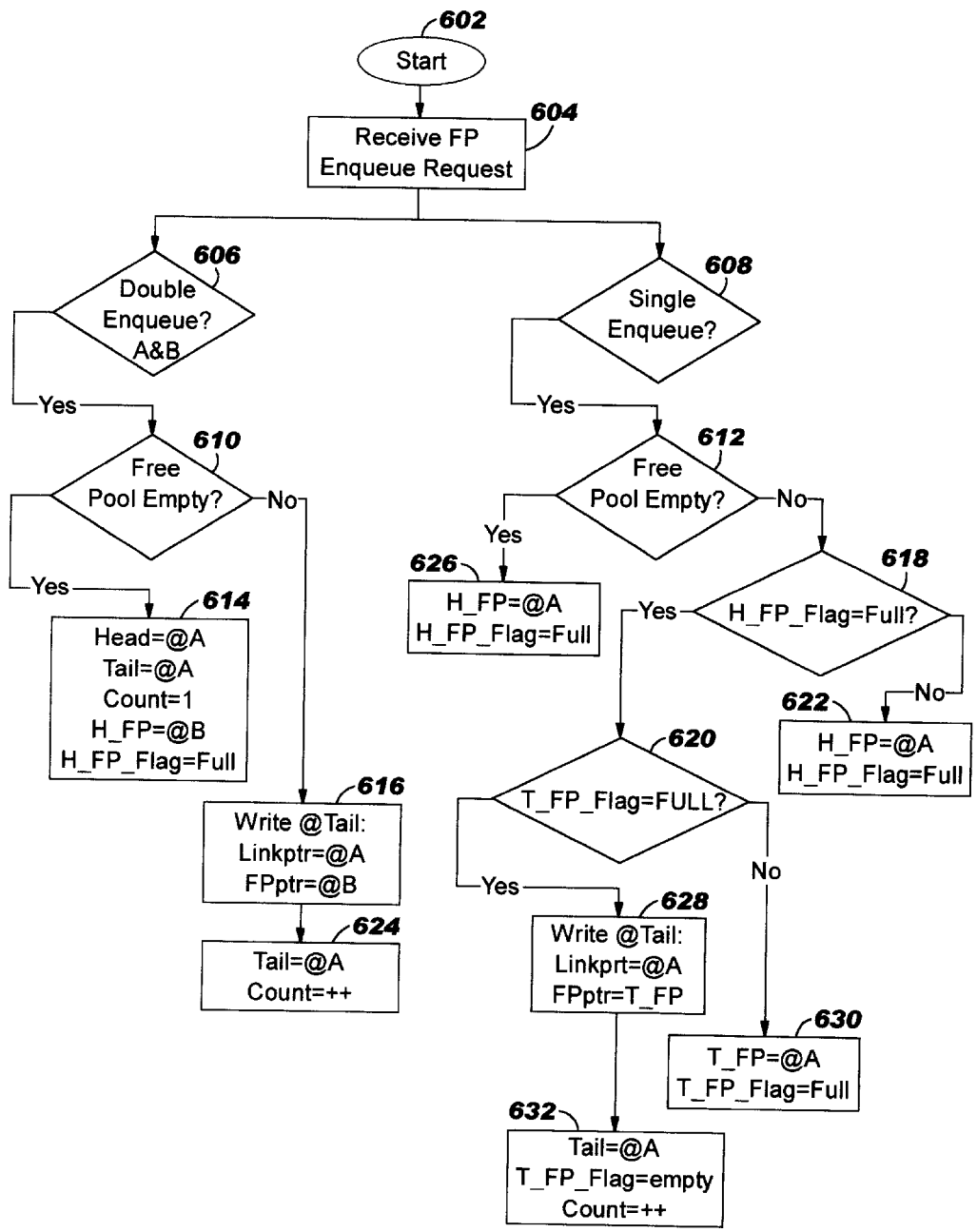
FIG. 6 is a high-level logic diagram depicting method steps performed during linked free pool enqueueing in accordance with a preferred embodiment of the present invention.

With reference now to FIG. 6, there is illustrated a high-level logic diagram depicting method steps performed during linked free pool enqueueing in accordance with a preferred embodiment of the present invention. Proceeding from start step 602, a free pool enqueue request is received as depicted at step 604. Next, as shown at steps 606 and 608, a determination is made whether one block, "A", or two blocks, "A" and "B", are to be enqueued into the free pool. In either case, an assessment of whether the free pool is currently empty is performed as depicted at steps 610 and 612.

As illustrated at step 614, a double enqueue request to an empty free pool results in block A being the sole pointer block and therefore designated as both the head block and tail block. The address of block B is written into a H_FP register 415, making block B the "head" of the non-pointer blocks. The count within the free pool count register is incremented to one and a free pool head flag is set to "full". As shown at step 616, a double enqueue request to a non-empty free pool results in the address of block A becoming the link pointer within the pointer field of the current tail block. The dual pointing structure of the linked free pool as previously described with reference to linked free pool 418 enables the block B address to be written as the pointer within the data field of the current tail block during the write cycle in which block A was written as the link pointer. Step 624 depicts block A address being written to the free pool tail register and the count register being incremented by one.

A free pool having a dual linking structure such as that depicted within linked free pool 418 is also capable of enueueing a single block A. If the single enqueue request is made to an empty free pool, a flag, $H\_{FP}\_Flag$, is set to "full" indicating that block A has been enqueued into the free pool as a non-pointing head as shown at step 626. Proceeding to step 618, when a single enqueue request is made to a non-empty free pool, the setting of H_FP_Flag to "full" results in a further inquiry (step 620) to determine whether a non-pointer block has been collected. If so, a T_FP_Flag will be set to "full" and as illustrated at step 628, the address of bock A is written to the pointer block of the current tail and the non-pointer block address which is found in a T_FP register 417 is written to the data field. Similar to block 425 of FIG. 4, block A is a new free pool tail having no pointers. As illustrated at step 632, the T_FP_Flag is set to "empty" and the count is incremented. Step 630 depicts the enqueue of a single block A to a linked free pool in which H_FP_Flag is set to "full" while T_FP_Flag is set to "empty". In this case the address of block A is written to T_FP register 417 and T_FP_Flag is accordingly set to "full".

Returning to FIG. 4, it should be noted that the empty tail characteristic linked list 408 results in the need for retrieving two storage block addresses from the free pool when a flow queue such as linked list 408 goes from an empty to a non-empty state. The dual pointer linking system utilized by linked free pool 418 efficiently addresses this need. In accordance with the method and system of the present invention, free pool head block 422 serves as the point from which available storage blocks are dequeued from linked free pool 418. A data enqueue into linked list 408 necessitates a corresponding storage block dequeue from linked free pool 418. As explained in further detail within reference to FIG. 7, such a free pool dequeue operation includes reading free pool head register 414 to determine the address of head block 422. The dual pointer within free pool head block 422 enables the retrieval of two storage block addresses which are then available for data enqueuing into linked list 408. In accordance with a preferred embodiment of the present invention, such a free pool dequeue operation will result in blocks 422 and 428 being made available for use by linked list 408 while free pool head register 414 is updated with the address of the new head block 421. Only a single access is therefore required to accommodate the need for two storage block addresses when a flow queue within main memory 402 goes from an empty to a non-empty state.

Figure 7:
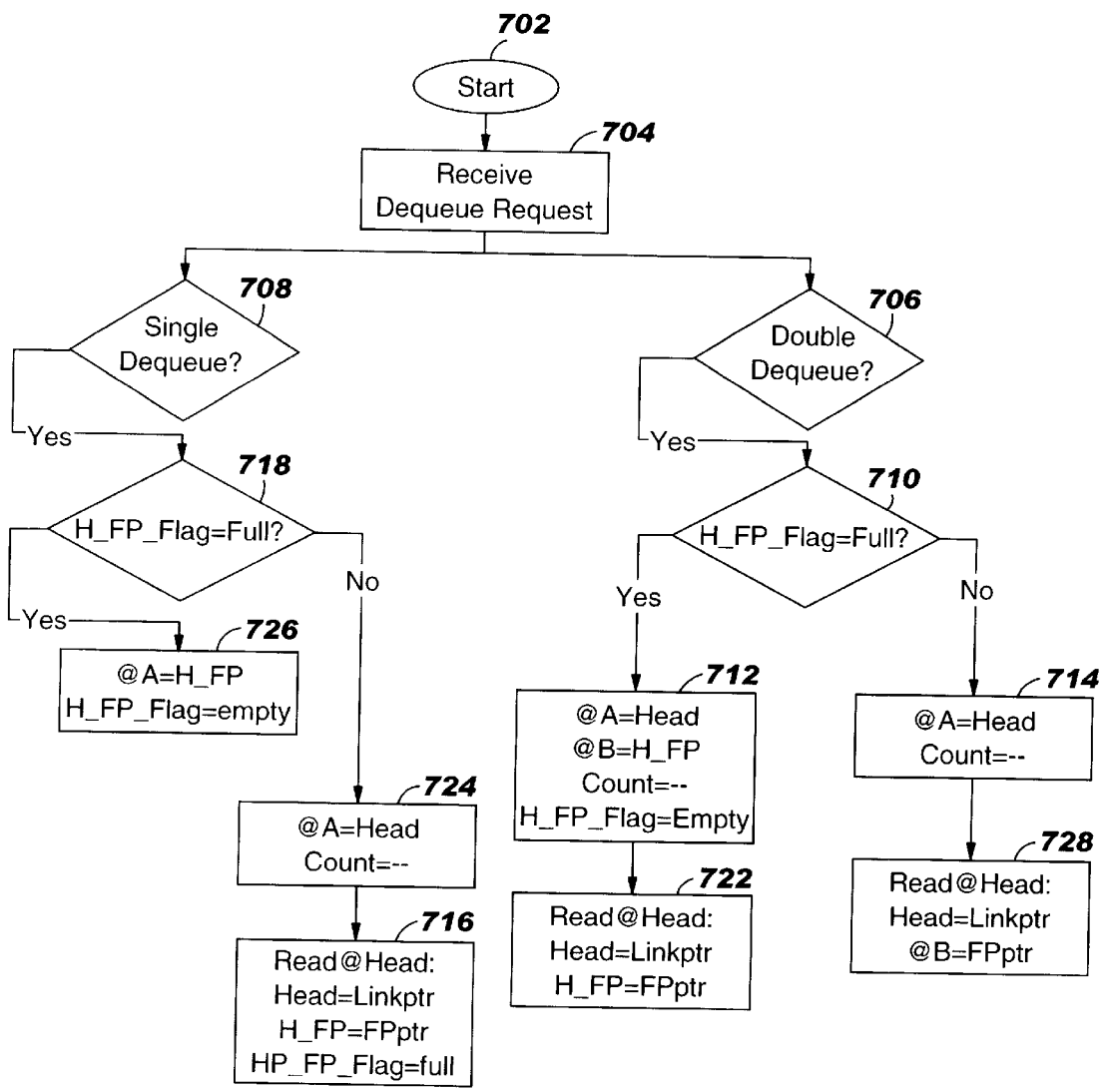
FIG. 7 is a high-level logic diagram illustrating method steps performed during linked free pool dequeueing in accordance with a preferred embodiment of the present invention.

With reference now to FIG. 7, there is illustrated a high-level logic diagram depicting method steps performed during linked free pool dnqueueing in accordance with a preferred embodiment of the present invention. Proceeding from start step 702, a free pool enqueue request is received as depicted at step 704. Next, as shown at steps 706 and 708, a determination is made whether one block, "A", or two blocks, "A" and "B", are to be dequeued from the free pool. If, as shown at step 708 a single dequeue is requested, a H_FP_Flag similar to that described in FIG. 6 is assessed. If H_FP_Flag is set to "full" then block A is dequeued from its position as the non-pointer free pool head (H_FP) and H_FP_Flag is set to "empty" as shown at step 726.

If, at step 718, H_FP_Flag is set to "empty" the current free pool head block is dequeued and the lined free pool count register is decremented as shown at step 724. The dequeuing of the head block results in the chain of events illustrated at step 716 in which the link pointer of the previous head becomes the new head and the free pointer of the previous head becomes the non-pointer block whose address is now written to the data field of the new head block.

Step 706 illustrates a double dequeue from a linked free pool such as free pool 418 of FIG. 4. As for the single dequeue, H_FP_Flag is assessed as depicted at step 710. If H_FP_Flag is set to "full", the previous free pool head, block A, is dequeued, as is the non-pointer block (block B) to which it points. The count register is decremented by two and H_FP_Flag is set to "empty" as illustrated at step 722. If H_FP_Flag is set to "empty", head block A is dequeued and the free pool count register is decrement (step 714). The second block to be dequeued, block B, will be the link pointer of head block A as shown at step 728.

Figure 5:
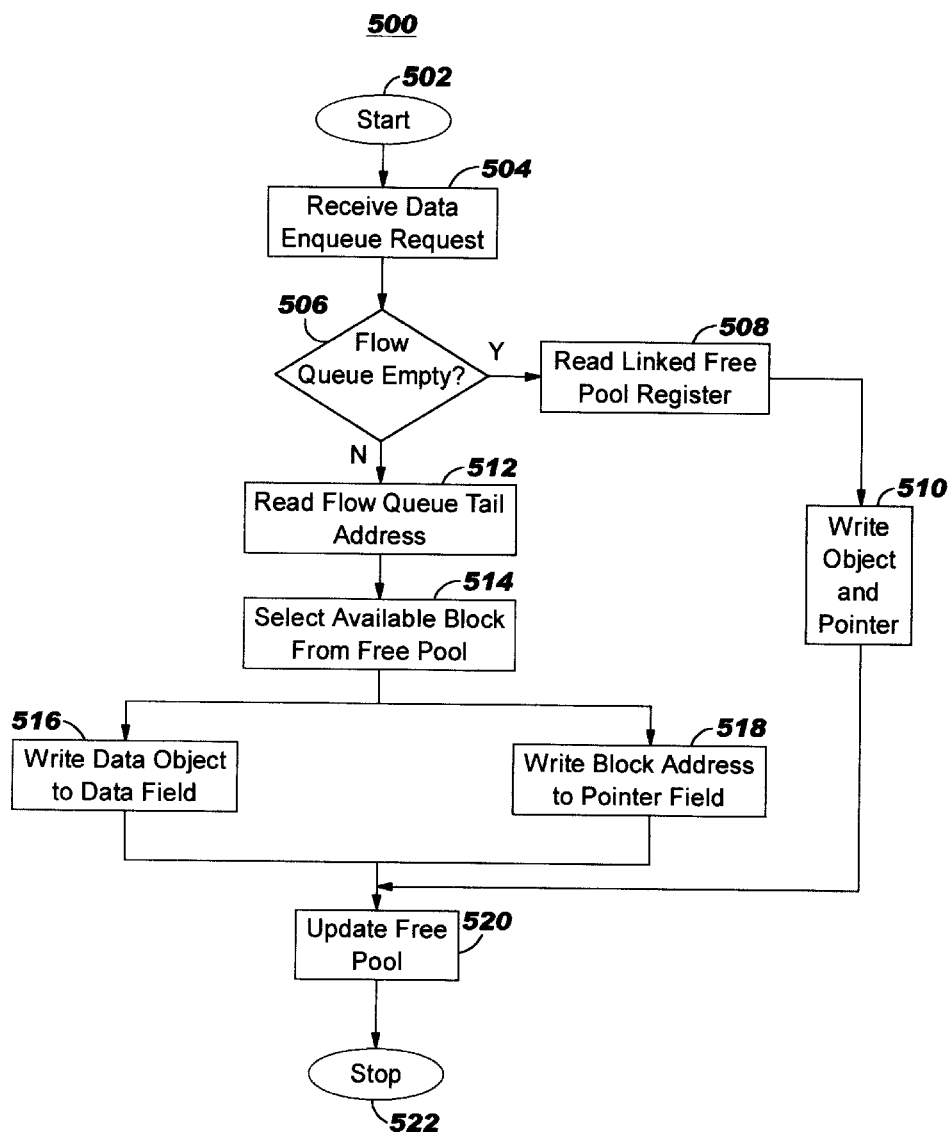
FIG. 5 is a high-level logic diagram illustrating a method for enqueueing and dequeueing data blocks to and from a linked list, in accordance with a preferred embodiment of the method and system of the present invention.

Referring now to FIG. 5, a high level logic diagram illustrates a methodology 500 for enqueueing and dequeueing data objects to and from a linked list in accordance with a preferred embodiment of the method and system of the present invention. Enqueueing methodology commences as depicted at start step 502 and proceeds to step 504 which illustrates receipt of a data enqueue request by a memory management system such as data storage system 400. This data enqueue request specifies a data object to be added to a flow queue which, in the depicted example, is a linked list. In accordance with an important feature of the present invention, the activity status of the selected flow queue is determined as shown at step 506 by assessing whether or not the queue is currently empty.

If the flow queue is empty, the memory management system of the present invention will respond by obtaining two storage block addresses from the dual linked head block within the linked free pool. A storage block dequeue operation from the linked free pool will thus be necessary (See FIG. 7). As depicted at step 508, this free pool dequeue operation will include reading the free pool register to access the addresses of two available free pool blocks. Next, as shown at step 510 a data object is written into the data field of the block pointed to by the free pool head register, and the associated free pointer is written to its pointer field. The head register is written with the pointer for the the new head block, the tail register is written with the address of the non-pointer block dequeued from the free pool, and the count register is set to one. As illustrated in FIG. 5, only a single access to the free pool and a single write operation thereafter are required to insert a data object into a previously inactive flow queue.

If the inquiry shown at step 506 results in a determination that the selected flow queue is not empty, the flow queue tail address is obtained from the tail register as depicted at step 512. Next, an available storage block is selected from the free pool as shown at step 514. Assuming that the selected flow queue utilizes the memory management systems depicted in either FIG. 2 or FIG. 3, only one write cycle will be required to perform the write operations illustrated at steps 516 and 518 in which both the data object and the pointer are written to the tail of the flow queue. The free pool block selected at step 514 becomes the new flow queue tail whose address is written to the tail register, and the count register is incremented.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the present invention as depicted in FIGS. 2, 3, 4, 5, 6, and 7 can be accomplished with a computer-aided device. In such a method, data stored in a memory unit of a data-processing system such as a data-processing system, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method for enqueueing a storage block having a pointer field and a data field to a linked list of storage blocks, said method comprising:

providing a free pool of storage blocks, wherein each of said storage blocks has a null pointer field and an empty data field;

in response to a request to enqueue a data object into said linked list, selecting an available storage block from said free pool;

updating an address within a tail register to point to said selected storage block as a tail storage block of said linked list; and contiguously writing a pointer into a pointer field of a storage block adjacent to said selected storage block and said data object into a data field of said storage block adjacent to said selected storage block, wherein said pointer is an address pointing to said selected storage block.

2. The method of claim 1, wherein said contiguously writing is performed within a same write cycle.

3. The method of claim 1, further comprising assembling said free pool of available storage blocks into a free pool linked list having a free pool tail block from which storage blocks are enqueued into said free pool linked list.

4. The method of claim 3, wherein said assembling further includes designating half of said available storage blocks within said free pool as either pointer or non-pointer blocks.

5. The method of claim 4, wherein said designating further includes collecting addresses of a storage block X and a storage block Y to be enqueued within said free pool linked list; and pointing from a data field of said free pool tail to said storage block X, such that storage block X is designated as a non-pointer block; and pointing from a pointer field of said free pool tail to said storage block Y, such that said storage block Y is designated as a pointer block replacing said free pool tail block as a storage block entry point for said free pool linked list.

6. The method of claim 5, wherein said pointing from a data field of said free pool tail to said storage block X further includes writing an address of said storage block X into a data field of said free pool tail, such that said free pool tail points to said storage block X.

7. The method of claim 5, wherein said pointing from a pointer field of said free pool tail to said storage block Y further includes writing an address of said storage block Y into a pointer field of said free pool tail, such that said free pool tail points to said storage block Y.

8. The method of claim 3, further comprising dequeueing two storage blocks from said free pool linked list.

9. The method of claim 8, wherein said free pool linked list comprises a free pool head block having a dual pointer pointing to a next pointer block and a non-pointer block, and a free pool head register for tracking said free pool head block, and wherein said dequeueing further includes collecting an address of said free pool head block from said free pool head register;

collecting addresses of a next pointer block and a non-pointer block; and updating said free pool head register with an address of said next pointer block.

10. An apparatus for enqueueing a storage block having a pointer field and a data field to a linked list of storage blocks, said apparatus comprising:

a free pool of storage blocks, wherein each of said storage blocks has a null pointer field and an empty data field;

in response to a request to enqueue a data object into said linked list, means for selecting an available storage block from said free pool;

means for updating an address within a tail register to point to said selected storage block as a tail storage block of said linked list; and contiguously writing a pointer into a pointer field of a storage block adjacent to said selected storage block and said data object into a data field of said storage block adjacent to said selected storage block, wherein said pointer is an address pointing to said selected storage block.

11. The apparatus of claim 10, wherein said storage device further comprises a head register for tracking a head block from which an associated data object within said linked list is dequeued from said linked list, said apparatus further comprising:

means for writing data from a data field of said head block into a qualifier register associated with said head register; and means for writing address of said head block into said head register, such that said head register points to said head block.

12. The apparatus of claim 10, wherein said free pool of available storage blocks is assembled into a free pool linked list having a free pool tail block from which storage blocks are enqueued into said free pool linked list.

13. The apparatus of claim 12, wherein said assembled free pool linked list comprises a plurality of available storage blocks linked by a dual pointer linking mechanism whereby half of the available storage blocks within the free pool linked list are pointer blocks and the other half are non-pointer blocks.

14. The apparatus of claim 13, wherein said pointer blocks include a dual pointer for pointing to the next sequential pointer block and for pointing to a non-pointer block.

15. A program product stored in signal bearing media for enqueueing a storage block having a pointer field and a data field to a linked list of storage blocks, said computer program product comprising:

instruction means for providing a free pool of storage blocks, wherein each of said storage blocks has a null pointer field and an empty data field selecting an available storage block from said free pool; and instruction means for contiguously writing a pointer into a pointer field of a storage block adjacent to said selected storage block and said data object into a data field of said storage block adjacent to said selected storage block, wherein said pointer is an address pointing to said selected storage block.

16. The program product of claim 15, wherein said instruction means for contiguously writing is performed within a same write cycle.

17. The program product of claim 15, further comprising instruction means for assembling said free pool of available storage blocks into a free pool linked list having a free pool tail block from which storage blocks are enqueued into said free pool linked list.

18. The program product of claim 17, wherein said instruction means for assembling further includes instruction means for designating half of said available storage blocks within said free pool as either pointer or non-pointer blocks.

19. The program product of claim 18, wherein said instruction means for designating further includes instruction means for collecting addresses of a storage block X and a storage block Y to be enqueued within said free pool linked list; and instruction means for pointing from a data field of said free pool tail to said storage block X, such that storage block X is designated as a non-pointer block; and instruction means for pointing from a pointer field of said free pool tail to said storage block Y, such that said storage block Y is designated as a pointer block replacing said free pool tail block as a storage block entry point for said free pool linked list.

20. The program product of claim 19, wherein said instruction means for pointing from a data field of said free pool tail to said storage block X further includes instruction means for writing an address of said storage block X into said data field of said free pool tail, such that said free pool tail points to said storage block X.

21. The program product of claim 19, wherein said instruction means for pointing from a pointer field of said free pool tail to said storage block Y comprises instruction means for writing an address of said storage block Y into said pointer field of said free pool tail, such that said free pool tail points to said storage block Y.

22. The program product of claim 17, further comprising instruction means for dequeueing two storage blocks from said free pool linked list.

23. The program product of claim 22, wherein said free pool linked list comprises a free pool head block having a dual pointer pointing to a next pointer block and a non-pointer block, and a free pool head register for tracking the free pool head block, and wherein said instruction means for dequeueing two storage blocks from said free pool linked list further includes
- instruction means for collecting said address of said free pool head block from said free pool head register;
- instruction means for collecting said addresses of said next pointer block and said non-pointer block; and
- instruction means for updating said free pool head register with said address of said next pointer block.

* * * * *